(12) United States Patent
Pirotte

(10) Patent No.: US 11,632,963 B2
(45) Date of Patent: *Apr. 25, 2023

(54) TUBER STORAGE

(71) Applicant: Arysta Lifescience Benelux Sprl, Seraing (BE)

(72) Inventor: Alan Pirotte, Houffalize (BE)

(73) Assignee: ARYSTA LIFESCIENCE BENELUX SPRL, Seraing (BE)

(*) Notice: Subject to any disclaimer, the term of this patent is extended or adjusted under 35 U.S.C. 154(b) by 1108 days.

This patent is subject to a terminal disclaimer.

(21) Appl. No.: 15/520,239

(22) PCT Filed: Oct. 20, 2015

(86) PCT No.: PCT/EP2015/074270
§ 371 (c)(1),
(2) Date: Apr. 19, 2017

(87) PCT Pub. No.: WO2016/062721
PCT Pub. Date: Apr. 28, 2016

(65) Prior Publication Data
US 2017/0311618 A1 Nov. 2, 2017

(30) Foreign Application Priority Data
Oct. 20, 2014 (EP) .................................. 14189559

(51) Int. Cl.
*A23B 7/154* (2006.01)
*A01N 65/36* (2009.01)
*A01N 27/00* (2006.01)
*A23L 3/3463* (2006.01)

(52) U.S. Cl.
CPC .............. *A23B 7/154* (2013.01); *A01N 27/00* (2013.01); *A01N 65/36* (2013.01); *A23L 3/3463* (2013.01); *A23V 2002/00* (2013.01)

(58) Field of Classification Search
CPC ........ A23B 7/154; A23B 7/144; A01N 65/36; A01N 27/00; A23L 3/3463; A23V 2002/00
See application file for complete search history.

(56) References Cited

U.S. PATENT DOCUMENTS

| | | | |
|---|---|---|---|
| 5,811,372 A | 9/1998 | Riggle et al. | |
| 6,723,364 B1 * | 4/2004 | Bompeix | A01N 31/16 426/102 |
| 8,153,561 B2 * | 4/2012 | Messerschmidt | A01N 27/00 504/357 |
| 10,638,769 B2 * | 5/2020 | Pirotte | A23B 7/154 |
| 2005/0044600 P1 * | 2/2005 | Khanuja | A01H 5/12 |
| 2006/0276336 A1 | 12/2006 | Sardo | |
| 2010/0298147 A1 | 11/2010 | Sardo | |
| 2010/0316738 A1 | 12/2010 | Jimenez et al. | |
| 2011/0003694 A1 * | 1/2011 | Sardo | A01N 35/06 504/118 |

FOREIGN PATENT DOCUMENTS

| | | |
|---|---|---|
| EP | 1728429 | 7/2009 |
| EP | 2253208 | 11/2010 |
| FR | 2 786 664 A1 | 6/2000 |
| FR | 2 886 516 A1 | 12/2006 |
| FR | 2 945 708 A1 | 11/2010 |
| GB | 1603047 | 11/1981 |
| RU | 2100921 C1 | 1/1998 |
| WO | 9210934 | 7/1992 |
| WO | 0032063 | 6/2000 |

OTHER PUBLICATIONS

Cizkova, H. et al., Caraway Essential Oil As Potential Inhibitor of Potato Sprouting, 2000, Rostlinna Vyroba, vol. 46, 501-507. (Year: 2000).*
Raal, A.. et al., The Content and Composition of the Essential Oil Found in Carum cavi L. Commercial Fruits Obtained From Different Countries, 2012, The Journal of Essential Oil Research, vol. 24, No. 1, pp. 53-59. (Year: 2012).*
Stashenko, E. et al. Changes in Chemical Composition of Catalytically Hydrogenated Orange Oil (Citrus sinensis), 1996, Journal of Chromatograph, A, vol. 752, pp. 217-222. (Year: 1996).*
"Chemical Engineering and Process Professional Experiment[M]," edited by Zhongming Li, 2013, p. 106, Sep. 30, 2013 (Machine Translation).
Flick, E.; "Advanced Cleaning Product Formulations," vol. 4; Noyes Publications, Westwood, NJ, USA; 1996; p. 43.

* cited by examiner

Primary Examiner — Abigail Vanhorn
Assistant Examiner — Ali S Saeed
(74) Attorney, Agent, or Firm — Cantor Colburn LLP

(57) ABSTRACT

The current invention concerns a method for sprout removal treatment of tubers, especially potatoes, preferably by fogging a highly concentrated limonene composition. The invention also concerns limonene treated tubers obtainable by said method. The invention further provides limonene compositions suitable for sprout removal by fogging. The invention is advantageous as it provides a renewable and natural sprout removal agent. It allows the removal of sprouts from tubers destined for the fresh produce market, where practically no pesticide residues are allowed.

9 Claims, 5 Drawing Sheets

TUBER STORAGE

CROSS-REFERENCE TO RELATED APPLICATIONS

This application is a § 371 of Application PCT/EP2015/074270 filed Oct. 20, 2015, which claims priority to 14189559.9 filed on Oct. 20, 2014, which are incorporated herein by reference in its entirety.

TECHNICAL FIELD

The invention pertains to the technical field of food storage, in particular the storage of tubers, preferably potato tubers. More in particular the invention relates to the treatment of tubers by a plant derived active ingredient limonene. The invention is of particular importance to the field of fresh produce.

BACKGROUND

The storage of tubers such as potatoes is preferably done at a temperature between 2 and 10° C. However, at this temperature the potato converts starch into sugar and stores the sugar in the potato leading to a sweeter taste. In the French fries test, such potatoes color brown too fast when cooked (fry color). This leads to a lower quality of potato.

The cure to the build-up of sugar in the potato is to store the potatoes at a higher temperature, preferably around 15° C. a couple of weeks before the potatoes are put on the market. In this period the sugar level within the potato will drop, but the potato will start to produce sprouts or germs. Along with sprout formation, the potato will start to produce toxic glycoalkaloids. These molecules are not destroyed during cooking. This process makes the potato unsellable.

Some potato storages are not equipped with a climate control unit and the temperature within the storage depends on weather conditions. If the temperature within the warehouse can't be kept low enough, potatoes will start to sprout. Consequently, other treatment methods are required, especially for long term storage.

Synthetic sprout inhibitors are known. 3-chlorophenylisopropylcarbamate (CIPC) also known as chlorpropham, brings a potato, bulb or tuber in a dormant state with very little sprout formation (preventive mode of action). However, CIPC treatment leaves behind a film of CIPC residue on the treated tubers. This residue makes the treated products unfit to be marketed as fresh produce. In this market segment practically no residue level is tolerated (max. 4-10 ppm).

Maleic hydrazide is another growth regulator that inhibits sprout formation. Maleic hydrazide is applied on the foliage of the crop on the field before harvesting; the uptake of it is depending on field conditions. The maleic hydrazide is taken up by the crop, like potato, and is stored inside the tuber for a relatively long time (preventive mode of action). The maximum residue level is 50 ppm. Consequently the treatment with maleic hydrazide is not acceptable for products destined for the fresh produce market segment.

With the higher degree of customer awareness about pesticidal residues on food products and the higher demand for biological produced vegetables, there is a demand for effective alternatives to synthetic sprout inhibitors, such as CIPC and maleic hydrazide. To find acceptance in the bio-market segment, an alternative treatment is preferably based on a renewable resource, leaving no residue.

Several terpenes have been studied as alternatives. In WO 92/10934 a study of monoterpenes and their oxides in terms of their ability of inhibiting potato sprouting was reported. It was concluded that limonene did not have an influence on potato sprouting at a headspace concentration of 1.70 mg/L after 7 days. Three unsprouted potatoes treated by exposure to a 2 ml limonene soaked filter paper in a 9.21 desiccator flask returned a reading of 0% eyes with sprouts. The mode of action is not provided. The period of storage is not specified.

A known natural alternative is spearmint oil, with R-carvone as active ingredient. Spearmint oil is effective in stopping sprouting, but on potatoes it leaves a minty taste and a negative effect in the fry color test can be observed. Mint oil is also likely to be cost-prohibitive.

Other alternatives are caraway oil, with S-carvone as active ingredient and clove oil, with eugenol as the active ingredient. Both have an influence on taste and are much more expensive than the currently used synthetic anti-sprouting agents.

In WO 00/32063 a fog treatment method is disclosed using a liquid composition for the treatment of potatoes. One of the examples uses a 60 wt % limonene composition with 7 wt % non-ionic emulsifier and 33 wt % butyl acetate solvent. The treatment protocol consisted of 45 g/ton at the start of storage and 15 g/ton every 20 days, thereby delivering 165 g of active ingredient per ton of potatoes over a 6 month period. After a period of 5 months the limonene treated potatoes showed weight loss (4.5% vs 5.4%) and sprout growth (96.8% vs 100%; compared to 18% for CIPC) close to that observed for the untreated control.

In U.S. Pat. No. 5,811,372 a method of controlling sprout formation in potatoes is disclosed using thermal fogging techniques. At 125 days after treatment, a combined use of 16.6 ppm CIPC with 16.6 ppm limonene showed 97% unsuitable for fresh pack use. Tubers having sprouts which on average are greater than 1 mm were considered unacceptable for fresh pack.

Hence, there is a need in the art to provide further alternative treatment methods for the storage of tubers, especially for potato tubers.

The industry is actively seeking alternatives to sprout suppressors that offer a comparative level of effectiveness as for instance CIPC (chlorpropham). Growers who sell to organic markets and export markets with stricter limits are strongly seeking alternative options. Some countries have even imposed zero tolerance policies. Demands for the fresh market have placed increasingly strict limits on the amount of CIPC residue that can remain on potatoes sold to consumers.

It is clear that the potato growing industry will benefit from new economical and effective alternatives.

The present invention aims to provide an improved method for the storage of tubers, in particular potato tubers. In particular, the invention aims to provide treated tubers acceptable to the fresh produce market. Suitable compositions will also be provided.

SUMMARY OF THE INVENTION

The present invention thereto provides a method for improved tuber storage, comprising the steps of: applying to a sprout-bearing tuber a composition comprising at least 50% limonene, expressed as weight of limonene compared to the total weight of said composition, in an amount effective to remove said sprout.

It was surprisingly found that by application of a concentrated limonene composition, germ formation in tubers can be treated effectively. Germs that come in contact with an appropriate dose of limonene fell off. For germs that are still in an early development stage, the removal of the sprout did not leave marks on the tuber. This stage can be described as sprouts shorter than 5 mm. An advantage of limonene's volatility is that a treatment does not leave pesticide residues.

The invention thus provides in an alternative to sprout inhibitors. The use of synthetic sprout inhibitors like CIPC can be avoided. The treatment is at low cost, hence economically feasible.

Limonene treated tubers, treated according to a method of the invention are characterized by the absence of limonene residues. The flavor of the tubers is not influenced by the limonene treatment. Limonene treated tubers performed well in a fry test. Potatoes treated with limonene can be used in the processing industry as well as fresh produce market.

In a further aspect, the invention provides in a composition for sprout removal from a sprout-bearing tuber and suitable for application by fogging, said composition comprising at least 50% limonene expressed in weight versus the total weight of the composition.

A limonene based composition for fogging has the advantage that product spills from the fogging equipment can be reduced or even avoided. Prior art compositions having less volatility than limonene showed liquid spills coming out of the fogging equipment. The spilled liquid made stains. To an applicator this is undesirable as it requires clean-up.

By the term "fogging" as used in the present invention, is meant the vaporization of pesticides in the form of fog for distribution and application of the pesticide. Fogging is carried out by a fogging machine or fog air sprayer. This type of equipment is known to a person skilled in the art. A fogging machine may consist of a fuel tank, formulation tank, pump, fogging nozzle, fogging coil, water pump and controls.

In a further aspect, the invention provides in the use of limonene as tuber sprout removal agent. In a preferred embodiment, said tuber is a potato.

Limonene has the advantage that it is from a natural source, e.g. orange oil. It is a renewable raw material. Use of limonene allows that sprout-bearing tubers that received a treatment, are still marketable even on the fresh produce market. The treatment leaves no limonene residues, has no influence on the taste, and hardly leaves a mark.

Preferred embodiments are worked out in the form of dependent claims.

DETAILED DESCRIPTION OF THE INVENTION

Figure 1:
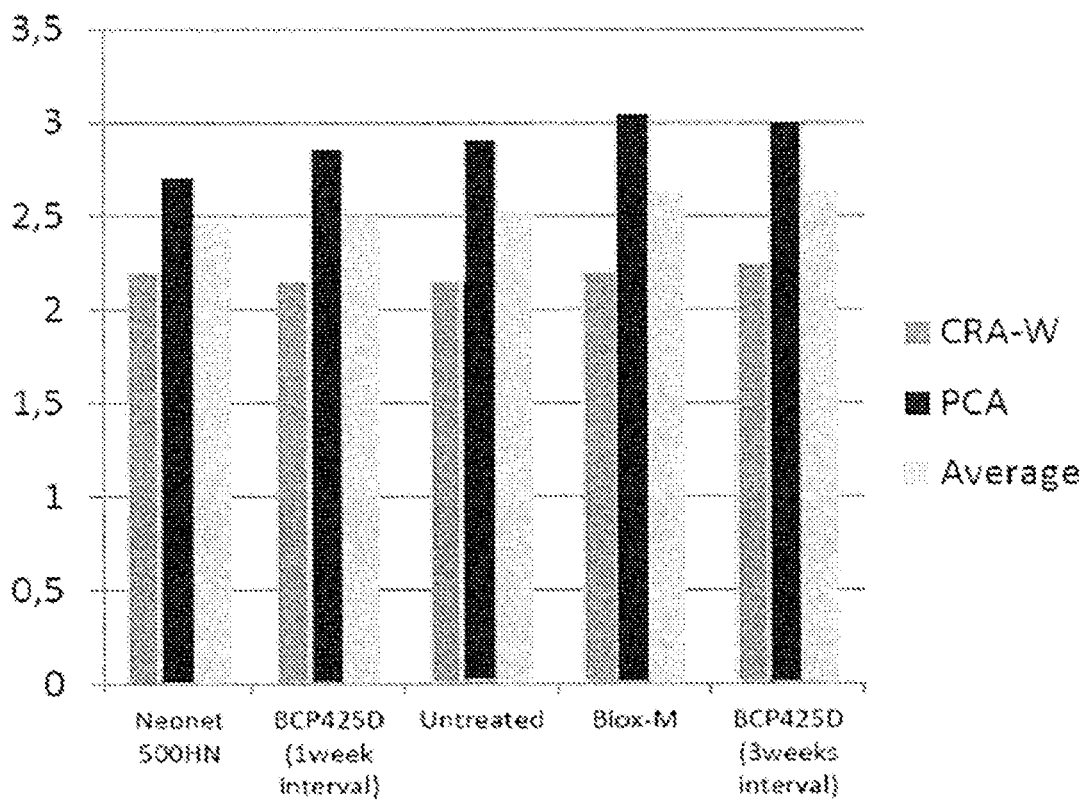
FIG. 1 provides a schematic representation of the results of a potato fry test. In a bar graph the color scores of potatoes having received different treatments, is displayed.

"About" as used herein referring to a measurable value such as a parameter, an amount, a temporal duration, is meant to encompass variations of 35+/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

The recitation of numerical ranges by endpoints includes all numbers and fractions subsumed within that range, as well as the recited endpoints.

The expression "% by weight" or "wt %" (weight percent), here and throughout the description unless otherwise defined, refers to the relative weight of the respective component based on the overall weight of the formulation.

As used herein, the term "tuber" refers to a modified plant structure that is enlarged to store nutrients for the plant to survive the winter or dry months. They provide energy and nutrients for regrowth and for asexual reproduction. In crops they can be found in potatoes (Solanum tuberosum), sweet potatoes (Ipomoea batatas), cassava (Manihot esculenta), yam (Dioscorea) and dahlia.

As used herein, the terms "sprout", "shoot" or "germ" are synonyms. The terms refer to the very early growth of a plant from a tuber.

The present invention provides in a composition for sprout removal from a sprout-bearing tuber and suitable for application by fogging, said composition comprising at least 50% limonene expressed in weight of limonene versus the total weight of the composition.

In a preferred embodiment, said fogging composition comprises at least 50 wt % limonene. More preferred, said fogging composition comprises at least 55 wt %, 60 wt %, 65 wt %, 70 wt % limonene or more based on the total weight of the composition.

A composition according to an embodiment of the invention comprises at least 50% limonene by weight, preferably 60% limonene by weight, more preferably 70% limonene by weight, even more preferably 80% limonene by weight and most preferably at least 90% limonene by weight, expressed versus the total weight of the composition. The high limonene content has the advantage that less volume of composition needs to be shipped and stored compared to a more diluted product.

Preferably the composition comprises at least 500 g/l limonene, preferably at least 600 g/l limonene, more preferably 700 g/l limonene, even more preferably 800 g/l limonene and most preferably at least 900 g/l limonene, expressed as amount of active ingredient with 100% purity relative to the total volume of the composition.

In a preferred embodiment, the composition comprises an essential oil, meaning an oil produced from a plant or a part of a plant. The presence of an essential oil makes the treatment agent more natural and uses sustainable resources in the production. Essential oils are often a side product of agriculture, and finding applications of these side-products can generate a higher economic value out of growing a crop.

In a preferred embodiment, the composition comprises only of an essential oil or a mixture of essential oils. This has the advantage that the composition is completely natural.

In a preferred embodiment the composition comprises orange oil. Orange oil consists of more than 90% of D-Limonene, an enantiomeric pure form of limonene. The limonene content of orange oil depends on the variety of oranges the oil comes from and depends on the region where the oranges are grown. Orange oil is classified by the FDA as "generally recognized as safe" and approved on the addition of orange oil to food. The price of orange oil is far less than the price of mint oil, clove oil or caraway oil, making orange oil the economically most favored option. Orange oil does not affect the taste of the treated tubers, preferably potatoes that much, as it does not contain menthol like mint oil does. It is the menthol that contributes to the mint flavor the with mint oil treated potatoes get.

In a more preferred embodiment said orange oil is selected from the list of technical grade orange oil, CAS 94266-47-4; food grade orange oil, CAS 8028-48-6 or cold pressed orange oil. The person skilled in the art is familiar with orange oil and its characteristics from its listing as active substance (SANCO/12083/2013 rev 3, 2013) and the standard references ISO 3140:211 and the European Pharmacopoeia 5.0, 2005.

In other embodiments said citrus fruit oil is selected from the group consisting of orange oil, lemon oil, lime oil, grapefruit oil and tangerine oil.

In a more preferred embodiment the composition is only orange oil, without any additives, or without any solvent. Only using orange oil makes the method completely natural and suitable to obtain biological produced vegetables. These vegetables can be sold at higher price than vegetables treated with other synthetic anti germinating agents.

In another embodiment, a surfactant is added to the composition comprising limonene. The choice of surfactant is preferably a non-ionic surfactant preferably selected from the list sorbitan monolaurate, sorbitan monopalmitate, sorbitan sesquioleate, sorbitan trioleate, polyoxyethylene sorbitan monolaurate, polyoxyethylene sorbitan monostearate, polyethylene glycol monooleate, polyethylene glycol alkylate, polyoxyethylene alkyl ether, polyglycol diether, lauroyl diethanol amide, fatty acid iso-propanolamide, maltitol hydroxy fatty acid ether, alkylated polysaccharide, alkyl glucoside, sugar ester, alkoxylated alcohol, oleophilic glycerol monostearate, self-emulsifiable glycerol monostearate, polyglycerol monostearate, polyglycerol alkylate, fatty alcohol alkoxylate, sorbitan monooleate, polyethylene glycol monostearate, polyoxyethylene sorbitan monooleate, polyoxyethylene cetyl ether, polyoxyethylene sterol, polyoxyethylene lanolin, polyoxyethylene bees wax, or combinations thereof.

In another preferred embodiment the surfactant is an anionic surfactant. The anionic surfactant is preferably selected from the list sodium stearate, potassium palmitate, sodium cetyl sulfate, sodium lauryl phosphate, sodium polyoxyethylene lauryl sulfate, triethanolamine palmitate, polyoxyethylene sodium lauryl phosphate, sodium N-acyl glutamate; and combinations thereof.

In a preferred embodiment, the limonene composition is in the form of a water emulsifiable composition (EC), comprising more than 50 wt %, 55 wt %, 56 wt %, 57, wt %, 58 wt %, 59 wt % or more than 60 wt % limonene and an emulsifying surfactant. In a preferred embodiment, the composition comprises more than 65%, preferably more than 70%, and most preferably more than 71 wt % of limonene relative to the total weight of the composition. A composition most preferred typically has a limonene content of 71-72 wt % relative to the total weight of the composition.

In a preferred embodiment, the composition is substantially free of water and any organic solvent, apart from the orange oil or limonene. By the term "substantially solvent free" as used in the present invention, is meant a composition with less than 10 wt % solvent, preferably less than 5 wt % solvent based on the total weight of the composition. With the term "solvent" is meant, a substance in which another substance is dissolved, forming a solution.

In a preferred embodiment the composition comprises less than 10 wt % solvent, preferably less than 5 wt % solvent, and most preferably is solvent-free, although traces, less than 0.1%, of solvent can't be excluded, all percentages are weight by weight. In a preferred embodiment the composition comprises less than 5% water and is most preferably water-free, although traces, less than 0.1%, of water can't be excluded, all percentages are weight by weight.

Preferably the non-ionic surfactant present in a composition according to the invention is a non-ionic polymeric surfactant. More preferable the polymeric surfactant is an alkoxylated alcohol, even more preferably a fatty alcohol alkoxylate, most preferably an ethoxylate and/or a propoxylate, preferably of a fatty alcohol, and most preferable an iso-tridecanol alkoxylate, even most preferably an iso-tridecanol penta-ethoxylate. The surfactant is preferably present in an amount of 5 to 40%, more preferably in 10 to 20%, most preferably 12-13%, all weight by weight. When limonene is added to water, it forms an oily layer on the water, the addition of a surfactant results in a stabile emulsion of limonene in water.

By the term "fatty alcohol" as used herein, is meant a linear or branched alcohol with a carbon chain length of at least 4 carbon atoms, preferably at least 6, more preferably at least 8, even more preferably at least 10, most preferably at least 12. Preferably the fatty alcohol has a carbon chain length of below 22, more preferably below 20, most preferably below 18 carbon atoms. Preferably the alcohol is a primary alcohol. More preferably the alcohol is a primary alcohol with a carbon chain length of 4-22 carbon chain atoms, most preferably 8-14 carbon chain atoms.

In a preferred embodiment, the composition comprises a wetting agent. It helps to lower the surface tension of the emulsion formed after adding the composition to water. This lower surface tension helps to coat a larger surface of the tubers.

The essentially water-free composition does not allow the wetting agents that are commonly used in the prior art. The wetting agent is commonly a water soluble anionic surfactant. These surfactants require water to form a stable solution, as their counter ion is commonly a calcium ion, an ammonium ion, a sodium ion or a potassium ion.

Anionic surfactants include agents such as sodium stearate, potassium palmitate, sodium cetyl sulfate, sodium lauryl phosphate, sodium polyoxyethylene lauryl sulfate, triethanolamine palmitate, polyoxyethylene sodium lauryl phosphate, sodium N-acyl glutamate; and combinations thereof.

The wetting agent in a composition according to the invention, is preferably an anionic surfactant with the anionic part preferably being an alkylbenzene sulfonate, more preferably a dodecylbenzene sulfonate. The cationic counter ion is preferably chosen out of the list of triethylammonium ion, triethanolammonium ion, tetrabutylammonium ion, or other tetra-alkylammonium ions, tetraphenylphosphonium ion or other tetraalkylphosphonium ions or a combination of a metal-ion and a crown ether.

In a preferred embodiment, the wetting agent preferably is an ethanolamine alkylbenzenesulfonate. In a preferred embodiment the wetting agent is triethanolammonium dodecylbenzene sulfonate, CAS: 27323-41-7. A combination of this anion and counter ion allows the wetting agent to be soluble in the composition without solvent other than the limonene. An emulsifiable composition of limonene and this type of surfactant in the absence of solvent other than the active ingredient, was found to have a good cold storage stability. Preferably the cold storage stability is provided in a temperature range between −20° C. and 5° C., preferably between −10° C. and 4° C., more preferably between −5° C. and 3° C., most preferably between −4° C. and 0° C. Cold storage stability was measured for compositions stored for a period of 7 days, conform to CIPAC MT 39.3: low temperature stability of liquid formulations. A sample is maintained at 0° C. for 1 h and the volume of any separated solid or oily matter is then recorded. Storage at 0° C. is continued for 7 days, any solid matter is settled by centrifuging and its volume recorded. Measurement methods are known to a person skilled in the art.

The wetting agent is preferably present in the emulsifiable composition in an amount of 5 to 25%, more preferably in 10 to 20%, most preferably 15-16%, expressed in weight percent by total weight of the composition.

In a preferred embodiment, the limonene composition comprises both a non-ionic and anionic surfactant.

In a preferred embodiment of the invention, the limonene composition is in the form of an emulsifiable concentrate (EC) comprising between 550 and 750 g/l limonene and one or more emulsion stabilizing surfactants. Preferably, a limonene composition according to the invention comprises 600-650 g/l limonene and 240-260 g/l of said one or more emulsion stabilizing surfactants.

Most preferably the composition comprising limonene comprises as surfactants a combination of an alkoxylated fatty alcohol and an ethanolamine alkylbenzenesulfonate.

In a preferred embodiment, the composition comprises an antioxidant. Preferably the antioxidant is chosen from the list diphenylamine, ethoxyquin, BHA which is a mixture of 3-t-butyl-4-hydroxyanisole and 2-t-butyl-4-hydroxyanisole, BHT corresponding to 2,6-di-tert-butyl-p-cresol, ascorbic acid, the tocopherols and the polyphenols. The presence of an antioxidant may protect the limonene from oxidising. For instance, traces of oxygen can get into the composition or the headspace of the bottle after the bottle has been opened. This is advantageous as limonene oxides are suspected sensitizers.

The antioxidant is preferably present in less than 1%, more preferable less than 0.5%, most preferably less than 0.1%, all weight by weight of the total composition.

In a preferred embodiment the antioxidant is BHT or BHA. The composition preferably comprises less than 1% BHT or BHA %, more preferable less than 0.5% BHT or BHA %, most preferably less than 0.1% BHT or BHA %, all weight by weight of the total composition.

A limonene based composition for fogging has the advantage that product spills from the fogging equipment can be reduced or even avoided.

The present invention provides in a treatment protocol with limonene, i.e. a plant derived active ingredient, that can replace sprout inhibitors like CIPC, i.e. a synthetic active ingredient. The treatment is at low cost, hence economically feasible.

In particular, the present invention provides a method for improved tuber storage, comprising the steps of: applying to a sprout-bearing tuber a composition comprising at least 50% limonene, expressed as weight of limonene compared to the total weight of said composition, in an amount effective to remove said sprout Removal of sprouts allows recovering potatoes that were regarded as unsellable due to the presence of sprouts. A composition according to the invention comprising limonene is applied preferably by fogging on potatoes and the sprout will "burn off". For a sprout of considerable size, a spot will be left on the surface of the potato, but it can be sold as a lower quality potato. Preferably those treated potatoes are sold to the potato processing industry.

In a preferred embodiment, the sprouts are below 15 mm, more preferably below 10 mm, even more preferably below 7 mm and most preferably shorter than 5 mm, 4 mm, 3 mm, 2 mm, 1 mm. For the fresh produce market, sprouts are equal to or below 1 mm.

It was surprisingly found that by application of a concentrated limonene composition, germ formation in tubers can be effectively treated. Germs that came in contact with limonene fell off. For germs that are still in an early development stage and do not display a visible sprout yet (white point stage), the removal of the sprout does not leave marks on the tuber. This stage can be described as sprouts shorter than 5 mm. Repeated application of limonene at a dose and interval effective to avoid substantive sprout growth, can replace treatment with synthetic active ingredients. This has the considerable advantage that the tubers, especially potatoes, can be sold as fresh produce.

The efficacy of the limonene treatment according to the invention was surprising, as prior art documents have shown that the person skilled in the art regards limonene as an inactive molecule in the inhibition of germination of tubers, including potatoes. Yet, the invention provides in an effective method of using a composition comprising limonene for the storage treatment of tubers, preferably potatoes.

Preferably said application of limonene is by fogging. By the term "fogging" as used in the present invention, is meant the vaporization of pesticides in the form of fog for distribution and application of the pesticide. Fogging is carried out by a fogging machine or fogair sprayer. A fogging machine may consist of a fuel tank, formulation tank, pump, fogging nozzle, fogging coil, water pump and controls.

In a preferred embodiment the application of the composition is done by cold fogging. By the term "cold fogging"

as used herein is meant that the composition is not heated above preferably 40° C., more preferably not more than 30° C. even more preferably not more than 20° C. and most preferably not more than 10° C. Preferably the cold fogging is carried out at a temperature higher than −10° C., more preferably a temperature higher than 0° C. and most preferably a temperature higher than 5° C. As limonene or orange oil is a volatile flammable liquid, the presence of a heat source in the fogging apparatus can represent a fire hazard. Furthermore cold fogging has the advantage that less or even no thermal degradation occurs compared to hot fogging. Cold fogging does not use any fuel, and no exhaust gasses are emitted in the storage chambers. These exhaust gasses influence the level of sugar in the potatoes and for this reason the storage chambers are being ventilated after the fog applied by hot fogging has settled. This ventilation is disturbing the storage chamber conditions and requires extra energy to restore the conditions back to the optimal values.

In another preferred embodiment the application of the composition is done by hot fogging. Product droplets obtained by hot fogging tend to be larger than by cold fogging. Using hot fogging, a better spread of the product can be obtained on the tubers compared to cold fogging.

In a preferred embodiment the composition will be applied in an initial dose between 60 ml and 400 ml limonene per tonne tubers, preferably between 70 and 300 ml, more preferably between 80 and 200 ml and most preferably around 90 ml limonene per tonne tubers. This initial dose is applied preferably the same day of storage, more preferably a week after storage, even more preferably 2 weeks after storage and most preferably a month after storage. This dose is high enough for the limonene to reach the middle of a pile of tubers and causes the same effect on for example a tuber at the bottom of the pile and a tuber at the top of the pile.

In a preferred embodiment the application of the composition comprising limonene is repeated every 3 days to 6 weeks, preferably between every 5 days to 4 weeks, more preferably between 1 week and 3 weeks and most preferably every 2 weeks. If repeated more often, no sprouts will be formed yet and treatment agent is wasted. If repeated less often, the sprouts will become bigger, and after treatment a visual spot will be present on the outside of the tuber where the sprout was. These spots will devaluate the tubers.

In a preferred embodiment the composition comprising limonene will be applied after the initial application in a subsequent dose of 20 ml to 300 ml limonene per tonne tubers, preferably of 30 to 300 ml, more preferably of 60 to 200 ml and most preferably around 90 ml limonene per tonne tubers. At this dose the bottom and the top of the pile will be treated completely.

Preferably a method of treatment according to the invention provides tubers that show no sprouts longer than 15 mm, preferably below 10 mm, more preferably below 7 mm, most preferably below 5 mm, even after they have been stored for a long period of time, i.e. stored for longer than 3 months, preferably longer than 5 months, more preferably longer than 7 months, and even more preferably longer than 9 months and most preferably up to 11 months. Preferably the storage period is 4 to 8 months.

In an alternative preferred embodiment, the initial application is not done by fogging but by spraying, wetting, dipping, drenching, showering, soaking, dampening, drizzling or dousing of the composition on the tubers at the moment of entering the storage chambers. The advantage is the initial application is faster and requires less energy than the fogging of the composition.

In a preferred embodiment the method will be carried out in a storage chamber. The storage chamber is preferably designed to store tubers, preferably potatoes, in a way to control the environment and will preferably only house tubers, preferably only potatoes. Preferably, the storage chambers are equipped with a temperature control system and even more preferably a humidity control system.

In a preferred embodiment the tubers to be treated are potatoes. Preferably the potatoes are destined to be sold on the fresh market. These potatoes can be sold for a higher price because these are residue free.

In a further aspect, the invention provides in limonene treated tubers obtainable by a method according to the invention. Tubers treated according to a method of the invention are characterized by the absence of limonene residues. The flavor of the tubers is not influenced by the limonene treatment.

In a preferred embodiment the tubers are potatoes. Potatoes are a crop of economic value. It is of interest that waste can be reduced. Recovery of potatoes, from unsellable to marketable at low price, is of interest particularly in view of their large volume of production.

In a preferred embodiment, potatoes treated with a method according to the invention, have a fry color below 2.5 as determined according to the Munsell USDA color test. It was found that limonene treatment has no negative impact on color formation. Potatoes treated in a method according to the invention can perform better in a taste test compared to untreated potatoes.

In a preferred embodiment the potato tuber is from a cultivar with a short dormancy period, like Lady Christl, more preferably a medium to long dormancy period, like Desiree, Charlotte, Bintje and most preferably a long to very long dormancy period, like Agria and Hermes.

In another preferred embodiment the potato tuber is from a cultivar selected from the group consisting of Russet Burbank, Ranger Russet, Umatilla Russet, Shepody, Norkotah Russet, Yukon Gold, Norchip, Gem Russet, Atlantic, Chipeta, Snowden, Charlotte, Dark Red Norland, Nicola, Bintje and Innovator. More preferably the potato tuber is from a cultivar of Bintje or Innovator.

In a further aspect, the invention provides in the use of limonene as tuber sprout removal agent, preferably as a potato sprout removal agent, more preferably as a potato sprout removal fogging agent.

Limonene has the advantage that it is from a natural source. It is a renewable raw material. Use of limonene allows that sprout-hearing tubers that received a treatment, are still marketable even on the fresh produce market. Limonene is a volatile oil, after application, the limonene will evaporate in less than a day leaving no residue on the treated tubers. These treated tubers can be sold on the market the next day with no limonene residue present on the tuber. The treatment has no influence on the taste, and hardly leaves a mark.

The present invention will be now described in more details, referring to examples that are not limitative.

Example 1: Preparation of a Composition for Use in Fogging

A composition suitable for use in cold fogging for the treatment of tubers was prepared as follows. Orange oil, food grade, was selected as a start material. To this terpene oil rich in limonene, emulsifying surfactants were added, in particular a non-ionic and ionic surfactant. The composition further comprised a limonene anti-oxidant. No solvent in addition to the components listed was added. The composition was as provided in Table 1.

TABLE 1

600 EC limonene composition, product code BCP425D

| Ingredients | g/l | wt/wt % |
|---|---|---|
| Orange oil | 630 | 71.6 |
| Anti-oxidant | 0.7 | 0.1 |
| Fatty alcohol ethoxylate | 112 | 12.7 |
| Ethanolamine alkylbenzenesulfonate | 137 | 15.6 |
| No additional solvent | | |
| Total | 879.7 | 100 |

Example 2: Tuber Treatment

In a second example, use of a 600 EC limonene composition according to example 1 the treatment of potatoes is illustrated. The treatment schedule is summarized in Table 2.

In this example, 10 equal amounts of potatoes (20 kg Bintje and 20 kg Innovator) were treated in 5 different cabins. The first cabin acted as a control. No treating agent was applied in the first cabin.

TABLE 2

Treatment schedule

| Test | Product | Conc (g/l) | Dose rate (ml/1000 kg) | Frequency |
|---|---|---|---|---|
| 1 | Untreated check | 0 | 0 | / |
| 2 | Neonet 500HN | 500 | 7,5 | 3 weeks interval |
| 3 | Biox-M/Biox-M | 1000 +1000 | 90 +30 | At start +3 weeks interval |
| 4 | BCP425D BCP425D | 600 +600 | 90 +30 | 3 weeks interval |
| 5 | BCP425D | +600 | 90 | 3 weeks interval |

To cabin 2 Neonet 500HN was applied by fogging, the active ingredient is chlorpropham (CIPC). The product was applied every 3 weeks at a dose of 7.5 ml/1000 kg potatoes. The first application was done 2 weeks after harvesting.

In cabin 3, BIOX-M was used, with mint oil comprising carvone as active ingredient. The first application was done 2 weeks after harvesting at a concentration of 90 ml/1000 kg potatoes. After this application, the next applications were at a dose of 30 ml/1000 kg potatoes.

In cabin 4, a composition according to example 1 was used, with limonene as active ingredient. The first application was done 2 weeks after harvesting at a concentration of 90 ml/1000 kg potatoes. After this application, the next applications were at a dose of 30 ml/1000 kg potatoes.

In cabin 5, the same composition as used in cabin 4 was used with 600 g/l limonene as active ingredient. The first application was done 2 weeks after harvesting at a concentration of 90 ml/1000 kg potatoes. Every 3 weeks the application was repeated at the same dose.

For all the cabins, the first treatment was on 22 October, 2 weeks after harvest. The potatoes were investigated for sprout formation at February 5, the next year, March 4, and April, 4. For each amount of potatoes the weight loss was determined, the sprout index was determined and the sprout weight was measured.

Figure 3:
FIG. 3 represents the treatment results expressed in sprout weight for different treatment regimens of potatoes. Each cabin except for the control was treated at three different times.

The sprout weight expressed in grams of the "Innovator"-variety potatoes is depicted in FIG. 3 for each cabin and at the 3 different times, corresponding to around 4, 5 and 6 months after harvest.

We conclude out of these data, that limonene had a sufficient effectiveness to be used as treatment agent on its own. Limonene did not leave residues on the potatoes, and did not have a negative influence on the taste and smell of the potatoes compared to mint oil.

Example 3: Application by Cold Fogging

In this application, the technique of cold fogging of a composition comprising limonene is illustrated. The treatment protocol is summarized in Table 3.

Potatoes of the variety "Innovator" came up directly from the field. No cleaning up and no grading were carried out. No special comment concerning the tubers was reported. The tuber quality was good. Each sack of potatoes was weighed before being placed in a treatment cell on November 12.

The cells were filled in such a way that the treatments were at mid-height in the cell. The rest of the cell, below and above the sacks required for the trial, was made up of filling potatoes. The total came to ±3400 kg per cell.

Each treatment was represented in each cell by 12 nets off 20 kg of potatoes; 4 replicates, 3 sampling and observation dates.

The products were applied in accordance with the protocol summarized in Table 3. In cell 1 by thermo-fogging using a FOG GENERATOR IGEBA TF-35 and in cell 2, 3 and 4 by cold fogging using a potato mist blower VEUGEN in the above part of the cell between bag fillings and the top of the cell.

The first hot and cold fogging application in the cells, on the potato variety "Innovator", was carried out on November 21. Since that moment, cold fogging applications were carried out weekly or at 3 weeks interval until March 27 of the following year, which corresponded respectively to a total of 19 and 7 applications.

The second hot fogging application was carried out on January 2, the next year, the third on February 13, and the last one on March 27.

The fogging protocol used was as follows. During storage the air temperature within the storage facility was kept between 5.0° C. and 9.5° C. The relative humidity was kept between 87% and 100%.

The application equipment used for hot fogging was an apparatus IGEBA TF-35 and for cold fogging an apparatus VEUGEN, type: FOGCOL. The apparatus was operated ate operation pressure was 3.3 Bar.

Cold and hot fogging conditions were similar to those obtained in local storage practice.

Around 15 minutes before treatment, Automatic Regulation was switched off and Manual Internal Ventilation was switched on (Force III) corresponding to a ventilation rate used of about 900 m3/h. It stimulates intern air circulation.

As the exact weight of tubers in the cell was known, the exact quantity of formulated product was calculated and prepared.

During spraying/fogging and until around 15 minutes after spraying, Internal Ventilation was kept switched on (Force III) to assure a good contact between product and tubers.

Around 15 minutes after spraying, Internal Ventilation was switched off

The day after (minimum 12 hours after end of spraying) Automatic Regulation was switched on till next application or till end of trial

TABLE 3

Treatment protocol

| Cabin/ treatment nr | Product | Conc | Type | Dose rate (ml/1000 kg) | Appl Description |
|---|---|---|---|---|---|
| 1 | Neonet 500 HN | 500 g/l | RN | 20 | |
|  | Neonet 500 HN | | | 10 | 6 week interval |
| 2 | Biox-M | 100 g/l | HN | 90 | |
|  | Biox-M | | | 30 | 3 weeks interval |
| 3 | BCP425D | 600 g/l | EC | 150 | |
|  | BCP425D | | | 50 | 3 weeks interval |
| 4 | BCP425D | 600 g/l | EC | 150 | |
|  | BCP425D | | | 50 | 7 days interval |
|  | BCP425D | | | 50 | 7 days interval |
| 5 | Untreated check | / | | / | |

In cabin 1, stored products were treated with Neonet 500 HN. This is a product with chlorpropham as active ingredient, in a concentration of 500 g/l, and available as a hot fogging concentrate (HN), i.e. a formulation suitable for application by hot fogging equipment, either directly or after dilution. A first application with 20 ml/1000 kg was repeated after 6 weeks with a 10 ml/1000 kg application.

In cabin 2, stored products were treated with Biox-M, a mint-oil product in the form of a hot fogging concentrate. An initial treatment with 90 ml/1000 kg was repeated after 3 weeks at a lower dose of 30 ml/1000 kg.

In cabin 3, an orange oil emulsion concentrate (EC) at 600 g limonene/l was used. An initial dose rate of 90 ml/1000 kg was used, followed by repeat applications at a 3 week interval of 50 ml/1000 kg.

In cabin 4, the same orange oil emulsion concentrate as used in cabin 3 was applied. An initial dose of 150 ml for 1000 kg stored products was followed by a repeat application at 50 ml per 1000 kg stored products after 7 days, and again after a 7 days interval.

In cabin 5, which served as untreated check, no product was applied.

Example 4: Quality Control

Quality control tests were executed on treated products obtained from the treatments described in example 2. Two different taste and fry-color tests were performed on potato material, in respectively the research centers PCA and CRA-W.

PCA-Assessment

The fry-color test was done with the CKA-standard method to evaluate the color of the fries, according to the Munsell USDA Frozen French Fry Standard.

The French fries were baked for 3 minutes, on 180° C. The assessment was done on 20 fries.

A color index had to be lower than 3 or 4, and at least 80% of the French Fries should be in color class: 000, 00, 0, 1 or 2, to have good quality.

For the taste test, the potatoes were cut into 10 slices, and then boiled in steam. They were assessed by a tasting panel on taste. They were quoted from 1-9, with 1 referring to 'very bad' or 'nothing' and 9 to 'very good' or 'strong', according to the scale displayed in Table 4.

Figure 2:
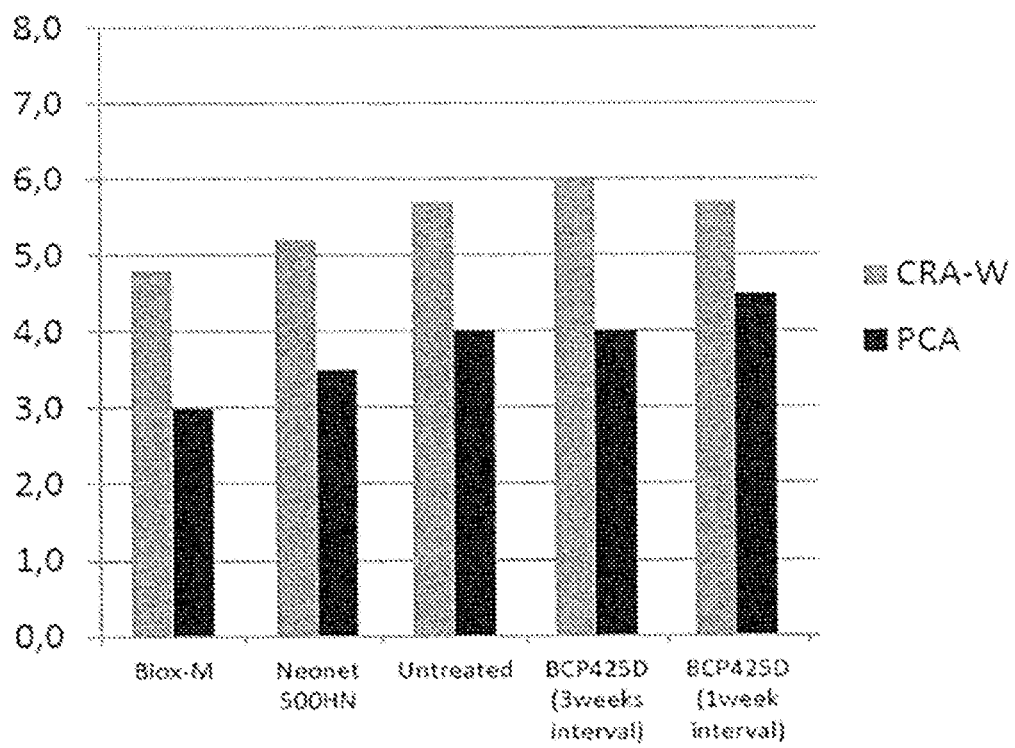
FIG. 2 provides a schematic representation of the results of a potato taste test. Potatoes received different treatments. The scores obtained in a taste test are presented in a bar graph.

The results are presented in FIG. 1 for the fry color and in FIG. 2 for the taste test.

CRA-W Assessment

To test the frying quality of the potatoes, there were 20 'central' fries taken from the center of the tubers, with a width of 1*1 cm. They were rinsed with water and then dried for a short period, preferably 10 min. After the drying they were put in hot oil for 3 minutes. The oil had a temperature of 180° C. After the frying the color was compared to a color card and scored.

When the index for the frying quality, which represents the color of the fries, was low, it means the color is more bright (bright yellow). When the number was rising, it means they are darker (brown).

The scale is the following: excellent, ≤2.5-3.0: good, 3.0-3.5: medium, 3.5-4.0: moderate and >4.0: bad.

Figure 6:
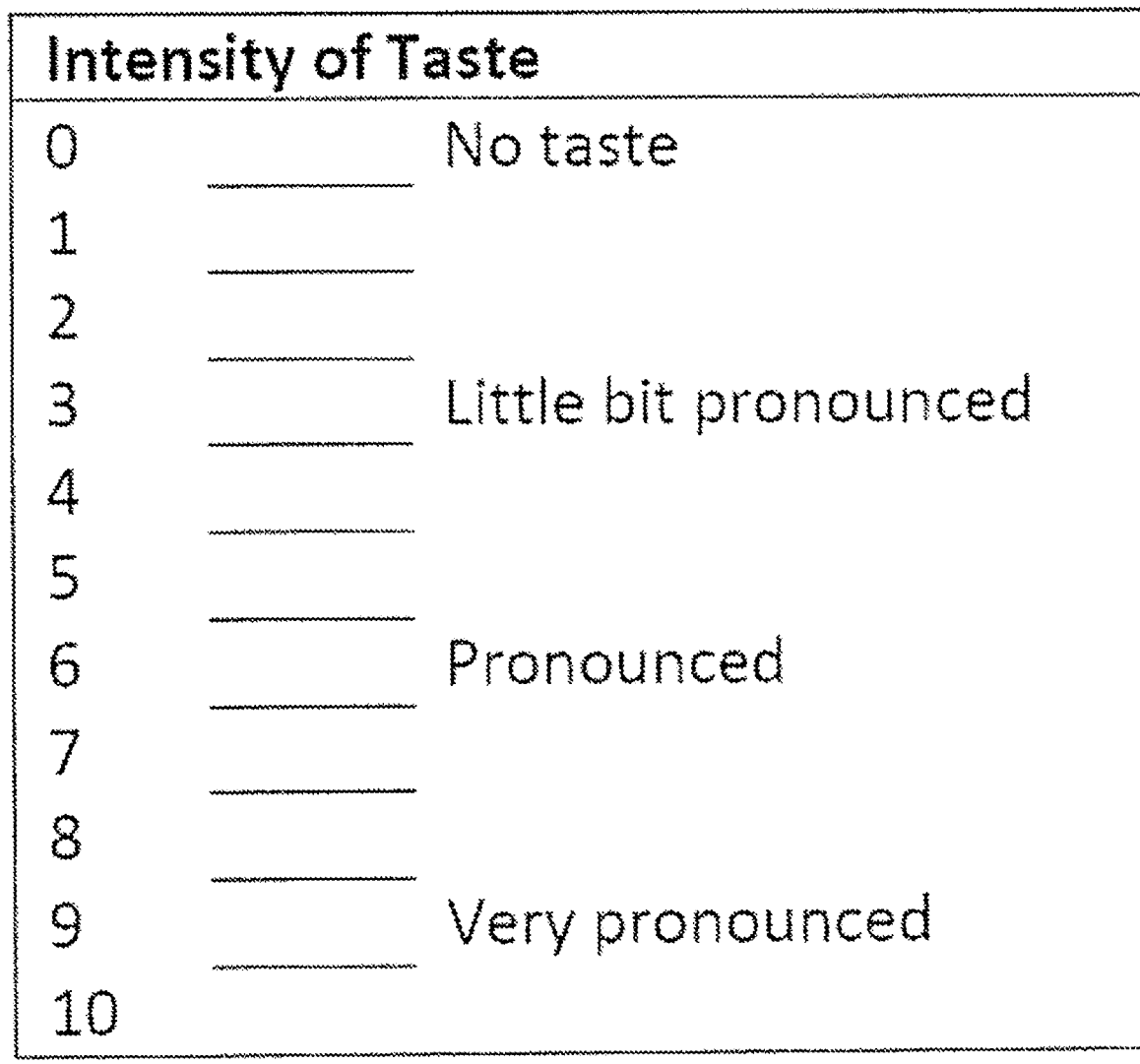
FIG. 6 shows the grading scale to assess taste intensity.

The evaluation of the taste was done by a panel of 6 persons, which are trained in the degustation of potatoes. The evaluation was done in a degustation room. The following scale was the one used for the evaluation (FIG. 6):

The assessment of the 20 samples was fried in 2 times, the same way as French fries are made for consumption. During the first frying, they were fried on 160° C. for 4 minutes, for the second frying they are fried on 180° C. for 2 minutes. Every member of the jury received 6 none salted French fries for each sample.

The results are presented in FIG. 1 for the fry color test and in FIG. 2 for the taste test. Contrary to mint oil there were no taste or smell issues.

Joined Test Results

FIG. 1 shows the test results for both the fry color tests. The tests show that a method according to the first aspect of the invention with an application every week, has better performances (the lower the value, the better) in the Mussel USDA color test than the untreated sample and the with mint oil treated sample. For the application of the composition comprising limonene, an interval of every 3 weeks, is still better than the application of mint oil.

FIG. 2 shows the results from both the taste tests. A method of treatment using limonene improves the taste (high values equals the best taste) of the potatoes compared to the untreated potatoes. A method using mint oil on the other hand performs worse compared the untreated potatoes in the taste test.

Example 6: Treatment with Orange Oil

Potatoes were treated with 100% orange oil every 3 weeks via application by cold fogging using a potato mist blower VEUGEN in the above part of a storage cell between bag fillings and the top of the cell.

The fogging protocol used was as follows. During storage the air temperature within the storage facility was kept between 5.0° C. and 9.5° C. The relative humidity was kept between 87% and 100%.

Around 15 minutes before treatment, Automatic Regulation was switched off and Manual Internal Ventilation was switched on (Force III) corresponding to a ventilation rate used of about 900 m3/h. It stimulates intern air circulation.

As the exact weight of tubers in the cell was known, the exact quantity of formulated product was calculated and prepared.

During spraying/fogging and until around 15 minutes after spraying, Internal Ventilation was kept switched on (Force III) to assure a good contact between product and tubers.

Around 15 minutes after spraying, Internal Ventilation was switched off.

The day after (minimum 12 hours after end of spraying) Automatic Regulation was switched on till next application or till end of trial Example 7: Treatment with Orange Oil, Results Potatoes from the variety Bintje, Innovator and Nicola were stored in a storage room and each storage room (trail number) was treated with a different product in the anti-sprouting treatment. Table 4 represents the treatment conditions for each chamber. BIO-024 stands for Orange oil, with at least 900 g limonene/l, BIOX M is a trade name of a mint oil based product that is commercially available as an anti-sprouting agent, Gro Stop fog is a trade name of a CIPC containing product for the treatment of sprouting of potatoes.

An overview of the fresh sprout weight and the weight loss of samples that were taken on 11 February, 11 March, 8 April and 6 May is given in Table 6. The results demonstrate that treatment every 3 weeks with 100 ml/ton of the composition gave less fresh sprout weight compared to BIOX M, the current natural alternative for CIPC. Treatment at 50 ml/ton, corresponding to 450 g limonene/ton or 450 ppm were not sufficiently effective to reach the levels of control obtainable by CIPC or mint oil. Storage was carried out from 11 October until 16 May the year after, all products were applied by fogging.

TABLE 4

TREATMENT CONDITIONS

| Trial number | Product | Application | Active ingredient | Dose rate (ml product/ton) | Total (ml product/ton) |
|---|---|---|---|---|---|
| 22 | Untreated | — | — | — | — |
| 16 | BIO-024 (50) | 3 weekly | Limonene | 10 times 50 | 500 |
| 17 | BIO-024 (100) | 3 weekly | Limonene | 10 times 100 | 1000 |
| 18 | BIO-024 (200) | 3 weekly | Limonene | 10 times 200 | 2000 |
| 19 | BIOX M | 3 weekly | Spear mint oil | First application 90, followed by 9 times 30 | 360 |
| 20 | Gro Stop fog | monthly | CIPC 300 g/l | First application 26 followed by 6 times 12.5 and last application 20 | 120 |

An overview of the treatment schedule can be found in Table 5.

TABLE 5

| | | | | | |
|---|---|---|---|---|---|
| | | treatment conditions | | | |
| Trial number | Product | Application | Active ingredient | Dose rate (ml product/ton) | Total (ml product/ton) |
| 22 | Untreated | — | — | — | — |
| 16 | BIO-024 | 3 weekly | Limonene | 10 times 50 | 500 |
| 17 | BIO-024 | 3 weekly | Limonene | 10 times 100 | 1000 |
| 18 | BIO-024 | 3 weekly | Limonene | 10 times 200 | 2000 |
| 19 | BIOX M | 3 weekly | Spear mint oil | First application 90, followed by 9 times 30 | 360 |
| 20 | Gro Stop fog | monthly | CIPC 300g/l | First application 26 followed by 6 times 12.5 and last application 20 | 120 |

Percentage weight loss was calculated using the formula:

Weight loss (%)=((weight at store loading−weight at store unloading(excl.spouts))/weight at store loading)*100

French fry frying quality was assessed (cv. Innovator and Bintje). Tubers were washed and peeled. Twenty French fry sticks were cut out of twenty tubers (one stick out of each tuber) and fried. The color of each French fry was assessed using the USDA index scale with seven categories 000-4 (000=very light (highest quality)-4 dark brown)).

Frying index (1-6) was calculated:

Frying index=$(0*n000+1*n00+2*n0+3*n1+4*n2+5*n3+6*n4)/n$ total($n$=number of fries per each category)

Fresh sprout weight was assessed by weighing all sprouts per sample. Sprout weight was calculated for a standard sized sample of 1.0 kg potatoes:

Fresh sprout weight(g)=fresh sprout weight sample/(weight sample unloading−sprouts)

TABLE 6

| | | dates of treatment | | | | | | | | | |
|---|---|---|---|---|---|---|---|---|---|---|---|
| Trial number | Product | T1 | T2 | T3 | T4 | T5 | T6 | T7 | T8 | T9 | T10 |
| 22 | Untreated | — | — | — | — | — | — | — | — | — | — |
| 16 | BIO-024 (50) | 22-10 | 12-11 | 3-12 | 24-12 | 14-1 | | 4-2 | 25-2 | 18-3 | 8-4 | 29-4 |
| 17 | BIO-024 (100) | 22-10 | 12-11 | 3-12 | 24-12 | 14-1 | | 4-2 | 25-2 | 18-3 | 8-4 | 29-4 |
| 18 | BIO-024 (200) | 22-10 | 12-11 | 3-12 | 24-12 | 14-1 | | 4-2 | 25-2 | 18-3 | 8-4 | 29-4 |
| 19 | BIOX M | 22-10 | 12-11 | 3-12 | 24-12 | 14-1 | | 4-2 | 25-2 | 18-3 | 8-4 | 29-4 |
| 20 | Gro Stop fog | 22-10 | 19-11 | 17-12 | 14-1 | 11-2 | 11-3 | 8-4 | 6-5 | — | — | |

TABLE 7

| | | Fresh sprout weight and weight loss | | | | | | | |
|---|---|---|---|---|---|---|---|---|---|
| | | Fresh sprout weight (g/kg) | | | | Weight loss (%) | | | |
| Trial number | Product | 11-2 | 11-3 | 8-4 | 6-5 | 11-2 | 11-3 | 8-4 | 6-5 |
| 22 | Untreated | 5.4 | 12.5 | 33.1 | 57.3 | 4.1 | 5.9 | 9.5 | 14.3 |
| 16 | BIO-024 (50) | 3.5 | 8.3 | 19.2 | 56.6 | 4.5 | 6.0 | 11.0 | 16.8 |
| 17 | BIO-024 (100) | 0.4 | 0.7 | 1.7 | 1.6 | 3.8 | 4.8 | 5.3 | 6.2 |
| 18 | BIO-024 (200) | 0.1 | 0.1 | 0.0 | 0.0 | 3.8 | 4.3 | 4.2 | 7.0 |

TABLE 7-continued

Fresh sprout weight and weight loss

| Trial number | Product | Fresh sprout weight (g/kg) | | | | Weight loss (%) | | | |
|---|---|---|---|---|---|---|---|---|---|
| | | 11-2 | 11-3 | 8-4 | 6-5 | 11-2 | 11-3 | 8-4 | 6-5 |
| 19 | BIOX M | 0.8 | 0.5 | 2.1 | 3.3 | 3.5 | 4.0 | 5.6 | 5.5 |
| 20 | Gro Stop fog | 0.1 | 0.2 | 0.3 | 1.0 | 3.7 | 4.4 | 4.9 | 5.6 |

TABLE 8

Average amount of sprouts after storage

| Product | Average amount of sprouts (g/kg) after storage | | | |
|---|---|---|---|---|
| | Bintje | Innovator | Nicola | Average |
| Untreated | 139.4 | 119.7 | 186.8 | 148.6 |
| BIO-024 (50) | 27.7 | 40.1 | 35.8 | 34.5 |
| BIO-024 (100) | 1.6 | 2.2 | 0.9 | 1.6 |
| BIO-024 (200) | 0.2 | 0.2 | 0.0 | 0.1 |
| BIOX M | 1.6 | 2.5 | 1.7 | 1.9 |
| Gro Stop fog | 2.6 | 7.1 | 1.9 | 3.9 |

TABLE 9

Average weight loss after storage

| Product | Average weight loss (%) after storage | | | |
|---|---|---|---|---|
| | Bintje | Innovator | Nicola | Average |
| Untreated | 16.1 | 18.2 | 27.1 | 20.5 |
| BIO-024 (50) | 11.6 | 12.9 | 14.9 | 13.1 |
| BIO-024 (100) | 6.5 | 5.3 | 8.2 | 6.7 |
| BIO-024 (200) | 5.8 | 4.3 | 7.7 | 5.9 |
| BIOX M | 6.0 | 4.5 | 8.1 | 6.2 |
| Gro Stop fog | 6.4 | 5.7 | 8.4 | 6.9 |

Example 8

A comparison was made between a spear mint oil treatment and an orange oil treatment. Spear mint oil treatment was with Biox M, a product formulated for electrofogging based mainly on carvone (65-85%). Orange oil treatment was with BIO 024, an orange oil with elevated content of limonene (at least 900 g limonene/l). A group of treatments was by cold fogging (group A), another group was by hot fogging, in particular by electrofogging. An untreated check was included as well. Treatment conditions (storage temperature, ventilation, humidity, used varieties, loading/unloading/distribution) were the same. Potatoes were harvested on 23 Sep. 2014 and loaded into the experimental chambers on 30 Sep. 2014. The potatoes were dried and then cooled down to 7° C. The first application took place on 21 Oct. 2014.

Figure 4A:
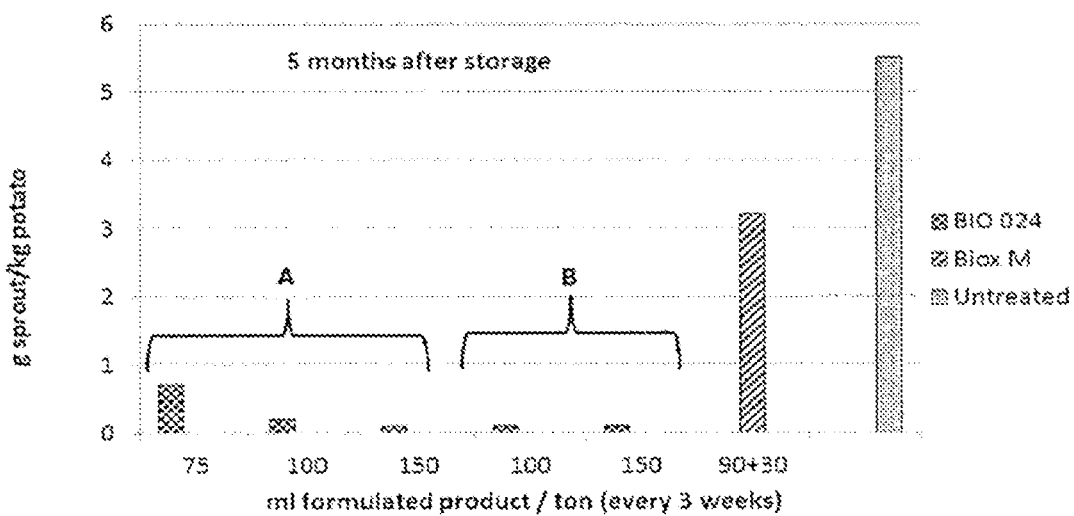
FIG. 4A presents the data obtained 5 months after storage, FIG. 4B provides the data for 6 months after storage.
Figure 4B:
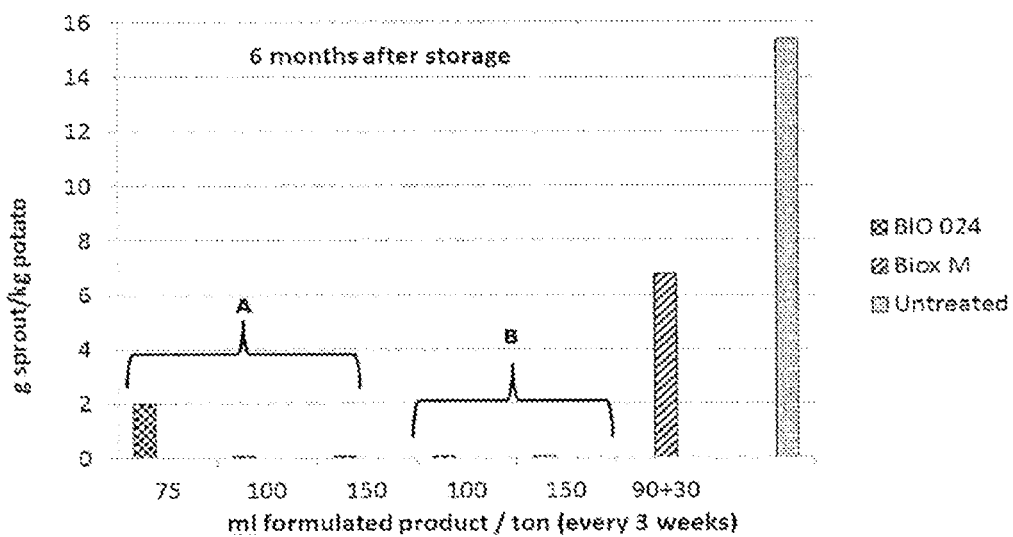
FIG. 4 represents a graphical representation of potato trial results. In the Y-axis sprout weight is presented and expressed in g sprouts/kg potato. In the X-axis the dose rate is represented expressed in ml formulated product per ton of potato, with a treatment interval of every three weeks. The bars with indication A, represent a cold fogging application, the bars with indication B, represent a hot fogging application (electrofog).
FIG. 4C provides the data 7 months after storage.
Figure 4C:
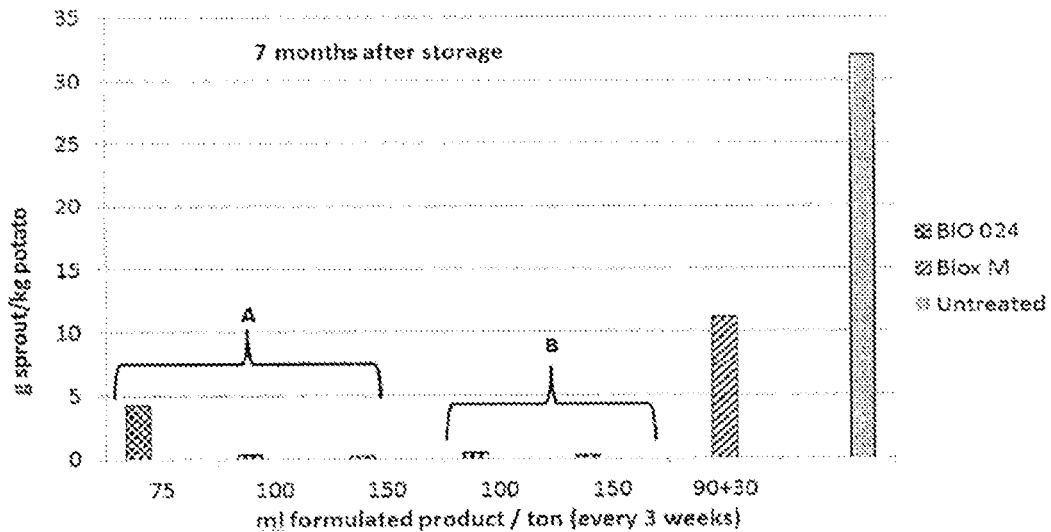

The results are summarized in FIG. 4, for different time periods of storage (FIG. 4A: 5 months after storage, FIG. 4B: 6 months after storage, FIG. 4C: 7 months after storage). Nine orange oil treatments provided between 675 to 1350 ml formulated product per ton (9×75 ml to 9×150 ml formulated product). For Biox-M a first application of 90 ml was followed with 9 times 30 ml applications, providing a total of 310 ml/ton.

From the results it can be concluded that orange oil treatment provided the best sprout growth control. Orange oil works by direct contact. A good spread over the surface of the potato is required to provide homogeneous control. From the figures it can be seen, that this is better obtained by hot than by cold fogging; hot fogging produced smaller droplets hence a better spreading of the product. There was a clear dose response relationship between 75 ml and 100 ml, but not between 100 ml compared to 150 ml. A dose of 100 ml formulated product per ton of potatoes at an interval of 3 weeks provided the best control. Efficacy is believed to be based on a curative effect.

In conclusions, it is demonstrated that orange oil/limonene treatment provided adequate sprout control, even in the absence of prior chemical treatments such as with maleic hydrazide or CIPC, over an extended period of time. It provided better sprout control compared to Biox-M, based on spear mint oil. In addition, it does not leave a mint taste in potatoes processed for the production of fries.

Example 9

Figure 5:
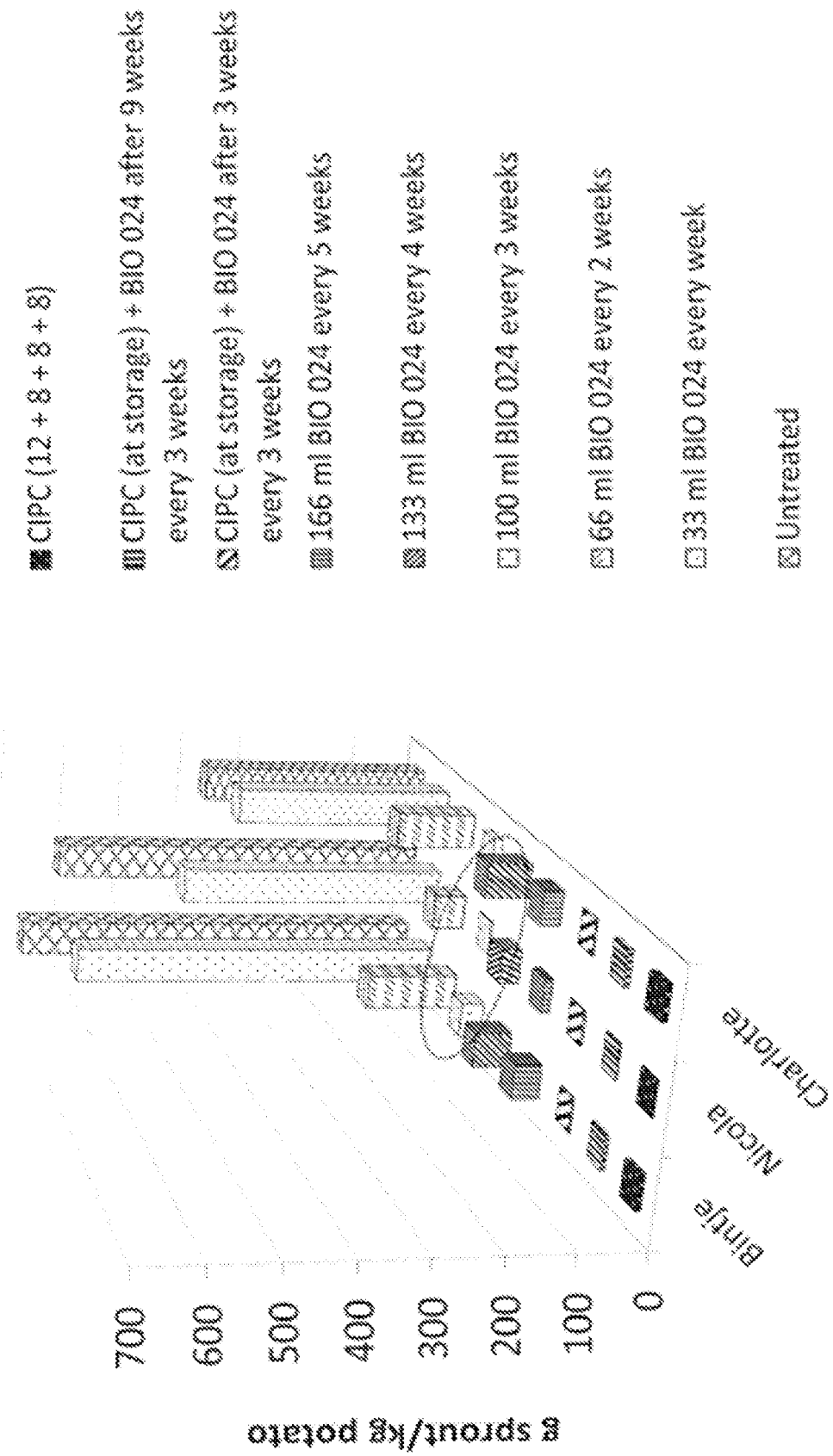
FIG. 5 represents a bar graph presentation of potato trial results obtained by hot fogging application (electrofog). Results are presented for trials on the potato variety Bintje (medium long to long dormancy), Nicola (medium long dormancy), Charlotte (long dormancy). Products used were CIPC or orange oil (BIO 024, x % limonene). The dose applied is expressed in ml product/ton. The frequency of application is also provided. In the first CIPC trial, 12 g active ingredient was applied on 5 Nov. 2014, 8 g active ingredient was applied on 31 Dec. 2014, 8 g active ingredient was applied on 25 Feb. 2015, and 8 g active ingredient was applied on 22 Apr. 2015, 2: CIPC (at storage)+BIO 024 after 9 weeks every 3 weeks, 3: CIPC (at storage)+BIO 024 after 3 weeks every 3 weeks, 4: 166 ml BIO 024 every 5 weeks, 5: 133 ml BIO 024 every 4 weeks, 6: 100 ml BIO 024 every 3 weeks, 7: 66 ml BIO 024 every 2 weeks, 8: 33 ml BIO 024 every week, 9: untreated. The results were recorded 5 months after storage.

An evaluation was conducted of several timings of application of Bio024 (940 g/l orange oil) on the potato varieties Bintje, Charlotte and Nicola, by hot fogging. The results are summarized in FIG. 5.

As references an untreated check was included, as well as treatments with CIPC 500 HN (500 g/l chlorpropham). The treatments have the same total dose of active substance. The dose rate per application is adapted accordingly to the frequency of application used. Four replications were made. The air temperature per unit was 8.3-10.4° C., % relative humidity was 90% at the start of the trial and 99% during the trial.

In a first trial a treatment schedule based on CIPC alone was used. Twelve grams active ingredient were applied on 5 Nov. 2014, followed by 8 g active ingredient applied on 31 Dec. 2014, 8 g active ingredient applied on 25 Feb. 2015, and 8 g active ingredient on 22 Apr. 2015, In total the maximum allowed amount of 36 g per ton of potato per year was applied, by means of 4 treatments.

In a second trial, 24 ml CIPC formulated product was applied at storage, corresponding to 12 g active ingredient. Nine weeks after storage 100 ml BIO 024 was applied, corresponding to 90 g limonene. This was followed by 100 ml BIO 024 treatments every 3 weeks. This corresponded to 6 treatments in total. In a third trial, 24 ml CIPC formulated product was applied at storage. 100 ml BIO 024 was applied 3 weeks after storage, followed by 100 ml BIO 024 treatments every 3 weeks. This corresponded to 8 treatments in total.

In a fourth trial 166 ml BIO 024 was applied every 5 weeks, in total 6 treatments. In a fifth trial 133 ml BIO 024 was applied every 4 weeks, corresponding to 7 treatments. In a sixth trial 100 ml BIO 024 was applied every 3 weeks, corresponding to 9 treatments. In a seventh trial 66 ml was applied every 2 weeks, in total 14 treatments. In an eight trial 33 ml BIO 024 was applied every week, in total 27 treatments. In a ninth trial, no treatment was made.

From the results it can be seen that the dosage regime of 100 ml BIO 024, or 90 g limonene, every 3 weeks, provides the best sprout control, when the product is used alone. Delivery of the same amount of active ingredient by means of a smaller single dose and shorter application frequency (e.g. 33 ml BIO 024 every week) or by means of a higher single dose and longer application frequency (e.g. 133 ml BIO 024 every 4 weeks) decreased efficacy of the product used solo.

A combination of CIPC at reduced dose (12 g active ingredient) with orange oil (active ingredient limonene) in 100 ml treatments, provided similar control compared to the CIPC application scheme that is in use today (12 g dose followed by three applications of 8 g, providing a total amount of 36 g active ingredient per ton of potatoes). Due to its volatility and absence of systemic effect, limonene does not contribute to residue findings. With this scheme, the amount of CIPC can be reduced while keeping the efficacy of sprout control. With a CIPC use at storage, the duration between CIPC application and removing the potatoes out of storage is long enough for reduction of the CIPC residue to levels that are even acceptable for the fresh produce market segment.

The invention claimed is:

1. A method for improved storage of a sprout-bearing tuber, comprising applying to the sprout-bearing tuber a composition comprising 500-900 g/l limonene in an effective initial dose of limonene between 80 ml and 300 ml per tonne of tuber, wherein said application is repeated at least once with an interval of 1 week to 4 weeks in a dose of limonene between 60 ml and 300 ml per tonne of tuber,
   wherein the tubers have no sprouts longer than 5 mm after storage for 4-8 months,
   wherein the limonene is not added in the form of mint oil, clove oil, or caraway oil.

2. The method according to claim 1, wherein said tuber is a potato.

3. The method according to claim 1, wherein said application is by fogging.

4. The method according to claim 1, wherein the limonene is in the form of orange oil.

5. The method according to claim 1, wherein said composition does not comprise a synthetic active ingredient.

6. The method according to claim 1, wherein said effective initial dose of limonene is between 80 ml and 200 ml per tonne of tuber.

7. The method according to claim 1, wherein said application is repeated at least once with an interval of 1 week to 3 weeks.

8. The method according to claim 3, wherein said fogging is implemented in storage chambers for said tubers.

9. The method according to claim 6, wherein said effective initial dose of limonene is between 100 to 150 ml/tonne of tuber.

* * * * *